United States Patent [19]
Fukushima et al.

[11] Patent Number: 5,260,361
[45] Date of Patent: Nov. 9, 1993

[54] COATING COMPOSITION

[75] Inventors: Hiroshi Fukushima; Misao Tamura; Osamu Takemoto; Takaji Kawaguchi, all of Aichi, Japan

[73] Assignee: Mitsubishi Rayon Co., Ltd., Tokyo, Japan

[21] Appl. No.: 978,423

[22] Filed: Nov. 18, 1992

[30] Foreign Application Priority Data

Nov. 21, 1991 [JP] Japan .................................. 3-306260

[51] Int. Cl.$^5$ .............................................. C08L 75/04
[52] U.S. Cl. ...................................... 524/98; 524/106; 524/336; 524/337; 524/718; 524/720; 524/736; 524/738; 528/60; 528/66; 528/73; 522/43; 522/46; 522/68; 526/301; 428/423.1
[58] Field of Search ................ 524/98, 106, 336, 337, 524/718, 720, 736, 738; 528/60, 66, 73; 522/43, 46, 68; 526/301; 428/423.1

[56] References Cited
U.S. PATENT DOCUMENTS 5,169,878 12/1992 Chen et al. ........................... 528/73

FOREIGN PATENT DOCUMENTS 0037978 10/1981 European Pat. Off. .
0100688 2/1984 European Pat. Off. .
2195643 4/1988 United Kingdom .

Primary Examiner—Maurice J. Welsh
Attorney, Agent, or Firm—Oblon, Spivak, McClelland, Maier & Neustadt

[57] ABSTRACT

Disclosed is a coating composition comprising (A) 10 to 70 parts by weight of a poly(meth)acrylate of mono- or polypentaerythritol, (B) 5 to 50 parts by weight of a urethane poly(meth)acrylate having at least two unsaturated double bonds in the molecule, (C) 5 to 50 parts by weight of a poly[(meth)acryloyloxyalkyl] (iso)cyanurate, (D) 2 to 30 parts by weight of an ultraviolet absorber, (E) 0.1 to 10 parts by weight of a photopolymerization initiator, and (F) 0.1 to 5 parts by weight of a hindered amine type light stabilizer, provided that the combined amount of components (A) to (F) is 100 parts by weight. This coating composition can form a crosslinked and cured film having excellent abrasion resistance, surface smoothness, thermal resistance, chemical resistance, durability, weather resistance and adhesion to the substrate.

18 Claims, No Drawings

COATING COMPOSITION

BACKGROUND OF THE INVENTION

1. Field of the Invention

This invention relates to coating compositions which, when applied to substrate surfaces and exposed to actinic radiation, can form a crosslinked and cured film having excellent abrasion resistance, surface smoothness, thermal resistance, chemical resistance, durability, weather resistance and adhesion to the substrate.

2. Prior Art

Synthetic resin molded articles formed of polymethyl methacrylate resin, polymethacrylimide resin, polycarbonate resins, polystyrene resin and AS resin are not only light in weight and excellent in impact resistance, but also have high transparency. In recent years, therefore, they have come to be widely used as automobile plastic parts including headlamps, glazings, instrument covers and the like. On the other hand, the surfaces of such synthetic resin molded articles do not have sufficient abrasion resistance, so that they are subject to damage as a result of contact with other harder objects, friction, scratching and the like. Since any damage caused to the surfaces of such synthetic resin molded articles diminishes their commercial value significantly and/or makes them unusable in a short period of time, it is strongly desired to improve the abrasion resistance of their surfaces. Moreover, where they are used as automobile parts, their weather resistance is also regarded as essential.

In order to overcome the above-described disadvantage of synthetic resin molded articles, various attempts have heretofore been made. For example, U.S. Pat. No. 4,006,271 discloses a method for improving the abrasion resistance of synthetic resin molded articles wherein a coating material comprising a silicone or melamine resin composition is applied to the surface of a synthetic resin molded article and thermally condensed to form a crosslinked film. Although a high degree of abrasion resistance can be achieved by this method, the resulting film tends to have insufficient adhesion to the surface of the molded article. In order to enhance this adhesion, it is necessary to use an acrylic polymer or a silicone as a primer. This is disadvantageous in that a complicated treating procedure is required. Moreover, the curing time is so long that economic losses and low productivity results.

In order to overcome these disadvantages, there have been proposed a number of methods wherein a resin composition comprising radical-polymerizable monomers is applied to a substrate and then exposed to actinic radiation to form a crosslinked film (U.S. Pat. Nos. 3,518,341, 4,041,120, 4,291,097 and 4,367,245).

These methods make it possible to produce highly abrasion-resistant synthetic resin molded articles in a short time and with high productivity. However, in order to use them as outer trim plastic parts for automobiles and the like, their durability, chemical resistance and weather resistance are less than satisfactory.

Especially in the case of synthetic resin molded articles formed of materials having inherently poor weather resistance, such as polycarbonate resins, the substrate may be deteriorated by the action of the actinic radiation (e.g., ultraviolet light) having passed through the cured film formed thereon, granting that the cured film itself has good weather resistance. As a result, it may happen that the molded articles undergo a marked yellowing and/or the cured film formed on the surfaces thereof is cracked or separated.

SUMMARY OF THE INVENTION

It is an object of the present invention to provide a coating composition which, when applied to substrate surfaces, can form a crosslinked and cured film having excellent abrasion resistance, surface smoothness, thermal resistance, chemical resistance, durability, weather resistance and adhesion to the substrate.

According to the present invention, there is provided a coating composition comprising (A) 10 to 70 parts by weight of at least one monomer selected from poly(meth)acrylates of mono- or polypentaerythritols having the general formula

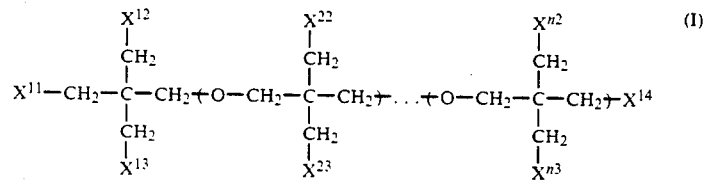

where at least three of $X^{11}$, $X^{12}$, $X^{13}$, $X^{22}$, $X^{23}$, ..., $X^{n2}$, $X^{n3}$ and $X^{14}$ are $CH_2=CR-COO-$ groups and the rest are $-OH$ groups, n is a whole number of 1 to 5, and R is a hydrogen atom or a methyl group, (B) 5 to 50 parts by weight of at least one urethane poly(meth)acrylate having at least two radical-polymerizable unsaturated double bonds in the molecule, (C) 5 to 50 parts by weight of a poly[(meth)acryloyloxyalkyl] (iso)cyanurate having the general formula

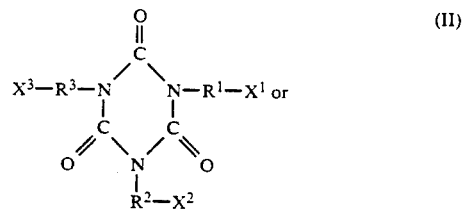

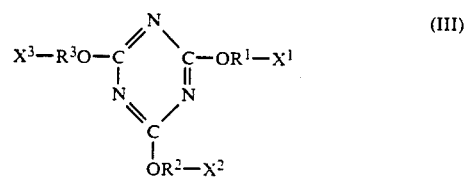

where $X^1$, $X^2$ and $X^3$ are acryloyl groups, methacryloyl groups, hydrogen atoms or alkyl groups and at least two of them need to be (meth)acryloyl groups, and $R^1$, $R^2$ and $R^3$ are single bonds or oxyalkylene groups of 1 to 4 carbon atoms, (D) 2 to 30 parts by weight of an ultraviolet absorber,
(E) 0.1 to 10 parts by weight of a photopolymerization initiator, and
(F) 0.1 to 5 parts by weight of a hindered amine type light stabilizer,
provided that the combined amount of components (A), (B), (C), (D), (E) and (F) is 100 parts by weight.

When this coating composition is applied to the surfaces of synthetic resin molded articles and exposed to actinic radiation, there can be obtained synthetic resin molded articles coated with a crosslinked and cured film having a thickness of 1 to 30 μm and thereby exhibiting excellent abrasion resistance, thermal resistance, chemical resistance, durability and weather resistance.

DESCRIPTION OF THE PREFERRED EMBODIMENTS

First of all, the various components constituting the coating compositions of the present invention are specifically described hereinbelow.

The poly(meth)acrylate of mono- or polypentaerythritol used as component (A) exhibits good polymerizability on exposure to actinic radiation and yields a highly abrasion-resistant polymer having a high crosslinking density. Accordingly, a crosslinked film having excellent abrasion resistance can be formed on substrate surfaces.

Specific examples of component (A) include pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol tetra(meth)acrylate, tripentaerythritol penta(meth)acrylate, tripentaerythritol hexa(meth)acrylate, tripentaerythritol hepta(meth)acrylate and tripentaerythritol octa(meth)acrylate. Among others, dipentaerythritol tetra(meth)acrylate, dipentaerythritol penta(meth)acrylate and dipentaerythritol hexa(meth)acrylate are preferred.

Component (A) is used in an amount of 10 to 70 parts by weight, preferably 25 to 50 parts by weight, per 100 parts by weight of the combined amount of components (A) to (F). If the amount of component (A) is less than 10 parts by weight, the resulting cured film does not have sufficient abrasion resistance. If the amount of component (A) is greater than 70 parts by weight, the resulting cured film is subject to cracking and tends to produce cracks after being tested for durability and weather resistance. Moreover, the resulting cured film shows a reduction in thermal resistance.

The urethane poly(meth)acrylate having at least two radical-polymerizable unsaturated double bonds in the molecule, used as component (B), serves to improve the toughness, flexibility, thermal resistance and weather resistance of the resulting cured film. This urethane poly(meth)acrylate can be, for example, a urethanation reaction product obtained from a hydroxyl-containing (meth)acrylate and an isocyanate compound having two or more isocyanate groups in the molecule (i.e., a polyisocyanate), or a urethanation reaction product obtained by reacting a polyisocyanate with a polyol to form an adduct and then adding a hydroxyl-containing (meth)acrylate to the remaining isocyanate groups of the adduct. The latter urethane poly(meth)acrylate is preferred because it brings about a greater improvement in the toughness and flexibility of the cured film. Moreover, it is preferable to use a urethane poly(meth)acrylate having a molecular weight of 1,000 to 5,000 because it improves the adhesion of the cured film to the substrate.

Specific examples of the polyisocyanate include polyisocyanate monomers such as tolylene diisocyanate, ethylene diisocyanate, 1,2-diisocyanatopropane, 1,3-diisocyanatopropane, 4,4'-diphenylmethane diisocyanate, xylylene diisocyanate, tetramethylxylylene diisocyanate, hexamethylene diisocyanate, bis(4-isocyanatocyclohexyl) methane, methylcyclohexane 2,4-diisocyanate, methylcyclohexane 2,6-diisocyanate, 1,3-bis(isocyanatomethyl)cyclohexane, isophorone diisocyanate, trimethylhexamethylene diisocyanate, tetramethylene diisocyanate, dimer acid diisocyanate and 2-isocyanatoethyl 2,6-diisocyanatohexanoate; biurets and trimers of the foregoing monomers; and the adducts of the foregoing monomers with various polyols. Among others, hexamethylene diisocyanate, bis(4-isocyanatocyclohexyl) methane, isophorone diisocyanate and 1,3-bis(isocyanatomethyl)cyclohexane are preferred.

No particular limitation is placed on the type of the polyol used for the synthesis of the adduct. Specific examples thereof include alkyl polyols such as ethylene glycol, propylene glycol, butylene glycol, neopentyl glycol, trimethylol propane, pentaerythritol, sorbitol, mannitol and glycerol, and polyether polyols derived therefrom; polyester polyols synthesized from a polyhydric alcohol and a polybasic acid; polyester polyols such as polycaprolactone polyols; and polyamide polyols. Among others, ethylene glycol, propylene glycol, butylene glycol and polyester polyols are preferred.

Specific examples of the hydroxyl-containing (meth)acrylate include 2-hydroxyethyl (meth)acrylate, 2-hydroxypropyl (meth)acrylate, 2-hydroxybutyl (meth)acrylate and 4-hydroxybutyl (meth)acrylate. Moreover, they also include the addition products of mono-epoxy compounds (such as butyl glycidyl ether, 2-ethylhexyl glycidyl ether and glycidyl methacrylate) with (meth)acrylic acid; mono(meth)acrylic esters of polyethylene glycols and polypropylene glycols; and mono(meth)acrylic esters of polycaprolactone diol. Among others, 2-hydroxyethyl acrylate, 2-hydroxyethyl methacrylate, 2-hydroxypropyl acrylate, 2-hydroxypropyl methacrylate, 4-hydroxybutyl acrylate and 4-hydroxybutyl methacrylate are preferred.

The reaction of a polyisocyanate, a polyol and a hydroxyl-containing (meth)acrylate is carried out by using the reactants in such proportions that isocyanate groups and hydroxyl groups are present in approximately equal amounts, and heating them at 60°-70° C. for several hours in the presence of a tin catalyst such as di-n-butyltin dilaurate. Since the reaction mixture generally tends to become highly viscous, it is preferably diluted with an organic solvent or other diluting monomer during the reaction or after completion of the reaction.

Component (B) is used in an amount of 5 to 50 parts by weight, preferably 15 to 35 parts by weight, per 100 parts by weight of the combined amount of components (A) to (F). If the amount of component (B) is less than 5 parts by weight, the resulting cured film does not have sufficient toughness and weather resistance. Moreover, the resulting coating composition has poor curability in an atmosphere of air. If the amount of component (B) is greater than 50 parts by weight, the resulting cured film shows a reduction in abrasion resistance.

The poly[(meth)acryloyloxyalkyl](iso)cyanurate of the general formula (II) or (III), used as component (C), exhibits good polymerizability on exposure to actinic radiation and serves to improve the toughness and thermal resistance of the resulting cured film without impairing its high abrasion resistance.

Specific examples of component (C) include bis(2-acryloyloxyethyl) hydroxyethyl isocyanurate, tris(2-acryloyloxyethyl) isocyanurate, bis(2-acryloyloxypropyl) hydroxypropyl isocyanurate, tris(2-acryloyloxypropyl) isocyanurate, bis(2-acryloyloxyethyl) hydroxyethyl cyanurate, tris(2-acryloyloxyethyl) cyanurate, bis(2-acryloyloxypropyl) hydroxypropyl cyanurate, tris(2-acryloyloxypropyl) cyanurate. Among others, bis(2-acryloyloxyethyl) hydroxyethyl isocyanurate and tris(2-acryloyloxyethyl) isocyanurate are preferred.

Component (C) is used in an amount of 5 to 50 parts by weight, preferably 10 to 40 parts by weight, per 100 parts by weight of the combined amount of components (A) to (F). If the amount of component (C) is less than 5 parts by weight, the resulting cured film does not have sufficient toughness and thermal resistance. If the amount of component (C) is greater than 50 parts by weight, the resulting cured film shows a reduction in abrasion resistance.

No particular limitation is placed on the type of the ultraviolet absorber used as component (D), and there may be used any ultraviolet absorber that can be homogeneously dissolved in the coating composition and imparts good weather resistance thereto. However, ultraviolet absorbers derived from benzophenone, benzotriazole, phenyl salicylate and phenyl benzoate and having a maximum absorption band in the wavelength range of 240 to 380 nm are preferred because they have good solubility in the coating composition and are effective in improving its weather resistance. Among others, ultraviolet absorbers derived from benzophenone are especially preferred in that the coating composition can contain them in large amounts, and ultraviolet absorbers derived from benzotriazole are especially preferred in that they can prevent substrate materials such as polycarbonate from yellowing. Thus, it is most preferable to use these two types of ultraviolet absorbers in combination.

Specific examples of component (D) include 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydroxybenzophenone, 2-hydroxy-4-octadecyloxybenzophenone, 2,2'-dihydroxy-4-methoxybenzophenone, 2,2'-dihydroxy-4,4'-dimethoxybenzophenone, phenyl salicylate, p-tert-butylphenyl salicylate, p-(1,1,3,3-tetramethylbutyl)phenyl salicylate, 3-hydroxyphenyl benzoate, phenylene-1,3-dibenzoate, 2-(2-hydroxy-5-methylphenyl)benzotriazole, 2-(2-hydroxy-5-tert-butylphenyl)-5-chlorobenzotriazole, 2-(2-hydroxy-3,5-di-tert-butylphenyl)benzotriazole, 2-(2-hydroxy-5-tert-butylphenyl)benzotriazole and 2-(2-hydroxy-4-octylphenyl)benzotriazole. Among others, 2,4-dihydroxybenzophenone and 2-hydroxy-4-methoxybenzophenone, which are derived from benzophenone, and 2-(2-hydroxy-5-tert-butylphenyl)benzotriazole and 2-(2-hydroxy-4-octylphenyl)benzotriazole, which are derived from benzotriazole, are especially preferred. These ultraviolet absorbers are more preferably used in admixture of two or more.

Component (D) is used in an amount of 2 to 30 parts by weight, preferably 5 to 15 parts by weight, per 100 parts by weight of the combined amount of components (A) to (F). If the amount of component (D) is less than 2 parts by weight, the resulting cured film does not have sufficient weather resistance and fails to effectively protect the substrate from ultraviolet radiation. If the amount of component (D) is greater than 30 parts by weight, the coating film cannot be cured sufficiently and the resulting cured film shows a reduction in toughness, thermal resistance and abrasion resistance.

The photopolymerization initiators which can be used as component (E) include, for example, carbonyl compounds such as benzoin, benzoin monomethyl ether, benzoin isopropyl ether, acetoin, benzil, benzophenone, p-methoxybenzophenone, diethoxyacetophenone, benzyl dimethyl ketal, 2,2-diethoxyacetophenone, 1-hydroxycyclohexyl phenyl ketone, methylphenyl glyoxylate, ethylphenyl glyoxylate and 2-hydroxy-2-methyl-1-phenylpropan-1-one; sulfur compounds such as tetramethylthiuram monosulfide and tetramethylthiuram disulfide; and acylphosphine oxides such as 2,4,6-trimethylbenzoyldiphenylphosphine oxide. These photopolymerization initiators may be used alone or in admixture of two or more. Among others, benzophenone, benzoin isopropyl ether, methyl phenylglyoxylate and benzyl dimethyl ketal are preferred.

Component (E) is used in an amount of 0.1 to 10 parts by weight, preferably 1 to 5 parts by weight, per 100 parts by weight of the combined amount of components (A) to (F). If the amount of component (E) is less than 0.1 part by weight, the resulting coating composition does not have sufficient curability. If the amount of component (E) is greater than 10 parts by weight, the resulting cured film suffers a coloration and shows a reduction in weather resistance.

The hinderd amine light stabilizers which can be used as component (F) include bis(1,2,2,6,6-pentamethyl-4-piperidyl) sebacate, bis(2,2,6,6-tetramethyl-4-piperidyl) sebacate, bis(1,2,2,6,6-pentamethyl-4-piperidyl) 2-(3,5-di-t-butyl-4-hydroxybenzyl)-2-n-butylmalonate, dimethyl succinate-1-(2-hydroxyethyl)-4-hydroxy-2,2,6,6-tetramethylpiperidine polycondensate, 1-{2-[3-(3,5-di-t-butyl-4-hydroxyphenyl)propionyloxy]ethyl}-4-[3-(3,5-di-t-butyl-4-hydroxyphenyl)propionyloxy]-2,2,6,6-tetramethylpiperidine, (mixed 1,2,2,6,6-pentamethyl-4-piperidyl/tridecyl) 1,2,3,4-butanetetracarboxylate, mixed {1,2,2,6,6-pentamethyl-4-piperidyl/$\beta$, $\beta$, $\beta'$, $\beta'$-tetramethyl-3,9-[2,4,8,10-tetraoxaspiro(5,5)undecane]diethyl} 1,2,3,4-butanetetracarboxylate and tetrakis(2,2,6,6-tetramethyl-4-piperidyl) 1,2,3,4-butanetetracarboxylate. Among others, bis(1,2,2,6,6-pentamethyl-4-piperidyl) sebacate and bis(2,2,6,6-tetramethyl-4-piperidyl) sebacate are especially preferred.

Component (F) is used in an amount of 0.1 to 5 parts by weight, preferably 0.5 to 2 parts by weight, per 100 parts by weight of the combined amount of components (A) to (F). If the amount of component (F) is less than 0.1 part by weight, the resulting cured film does not have sufficient weather resistance and durability. If the amount of component (F) is greater than 5 parts by weight, the coating film cannot be cured sufficiently and the resulting cured film shows a reduction in toughness, thermal resistance and abrasion resistance.

The coating compositions of the present invention comprises the above-described components (A), (B), (C), (D), (E) and (F). If necessary, they can further contain various additives such as organic solvents, antioxidants, anti-yellowing agents, bluing agents, pigments, leveling agents, anti-foaming agents, thickening agents, anti-settling agents, antistatic agents and anti-fogging agents. The organic solvent used should be chosen according to the type of the substrate material.

For example, where polycarbonate is used as the substrate material, it is desirable to use an alcohol solvent (such as isobutanol), an ester solvent (such as n-butyl acetate or diethylene glycol acetate) and a cellosolve solvent (such as ethyl cellosolve) in combination. The organic solvent may be used in an amount of 20 to 800 parts per 100 parts of the coating composition.

In order to apply the coating compositions of the present invention to substrates, there may be employed a variety of techniques such as brushing, spray coating, dip coating, spin coating and curtain coating. It is preferable to apply them with the aid of an organic solvent so that the application properties of the coating composition, the smoothness and uniformity of the coating film, and the adhesion of the cured film to the substrate may be improved.

After the coating compositions of the present invention are applied to substrates, they can be crosslinked by exposure to actinic radiation to form a cured film. More specifically, a coating composition in accordance with the present invention is applied to substrates so as to give a coating thickness of 1 to 50 $\mu$m and preferably 3 to 20 $\mu$m, and then exposed to ultraviolet light (in the wavelength range of 100 to 400 nm) from a high-pressure mercury vapor lamp or metal halide lamp until the quantity of light reaches an energy level of 1,000 to 5,000 mJ/cm$^2$. The atmosphere for exposure to ultraviolet light may be air or an inert gas such as nitrogen or argon.

The coating compositions of the present invention can be used to improve the surface quality of various synthetic resin molded articles constituting substrates. Such synthetic resin molded articles include those formed of various thermoplastic and thermosetting resins of which an improvement in abrasion resistance, weather resistance and other properties has heretofore been demanded. Specific examples of such materials include polymethyl methacrylate resin, polycarbonate resins, polyester resins, poly(polyester)carbonate resins, polystyrene resin, ABS resins, AS resin, polyamide resins, polyarylate resins, polymethacrylimide resin and poly(allyl diglycol carbonate) resin. Among others, polymethyl methacrylate resin, polycarbonate resins, polystyrene resin and polymethacrylimide resin can be effectively used as substrate materials for the coating compositions of the present invention because they have high transparency and are faced with a strong demand for an improvement in abrasion resistance. The term "synthetic resin molded articles" denotes a variety of molded articles formed of these resins, including sheet-like molded articles, film-like molded articles, various injection molded articles and the like.

The present invention is more specifically explained with reference to the following examples and comparative examples. In these examples, all parts are by weight. The cured films obtained in these examples were evaluated according to the following procedures.

(1) Appearance of the Cured Film

After a coating composition was applied to a substrate and cured, the appearance of the resulting cured film was visually evaluated. The cured film was rated as good (◯) when it had a smooth surface and was transparent; fair (Δ) when it was partially clouded; and poor (X) when it was whitened or clouded.

(2) Abrasion Resistance

A piece of #000 steel wool was attached to an end of a cylinder having a diameter of 25 mm, brought into contact with the surface of a horizontally disposed sample, and moved back and forth 50 times under a load of 1 kg. Then, the abrasion resistance of the sample was evaluated by measuring its diffuse transmission (or haze). The criteria for the evaluation of abrasion resistance were as follows:

Good (◯) The increase in haze is from 0 to 0.5, and practically no scratches are observed.

Fair (Δ): The increase in haze is from 0.5 to 3.0, and some slight scratches are observed.

Poor (X) The increase in haze is greater than 3.0, and severe scratches are observed.

(3) Adhesion

In the cured film, crosscuts were made at intervals of 1 mm so as to reach the surface of the substrate. Thus, a total of 100 squares each having an area of 1 mm$^2$ were formed in the cured film. A strip of cellophane adhesive tape was applied thereto and peeled off quickly, and the number of the squares removed from the substrate was counted. The adhesion of the cured film was rated as good (◯) when no square was removed; fair (Δ) when the number of the removed squares was from 1 to 50; and poor (X) when the number of the removed squares was from 51 to 100.

(4) Thermal Resistance

A coated plate sample was placed in a hot-air drying oven kept at 120° C. and allowed to stand for 24 hours. Thereafter, the cured film was visually examined for changes in appearance. The cured film was rated as good (◯) when no change was observed; fair (Δ) when minute cracks were observed; and poor (X) when cracks were observed over the whole surface of the coated plate.

(5) Weather Resistance

Using a sunshine carbon weatherometer (Model WEL-SUN-HC-B; manufactured by Suga Testing Machines Co., Ltd.) having a black panel temperature of 63°±3° C., a coated plate sample was tested by exposing it alternately to water spray for 12 minutes and artificial sunshine for 48 minutes. After 1,000 hours and 2,000 hours of exposure, the cured film was examined for changes in appearance and tested for adhesion.

(a) As to discoloration, the cured film was rated as good (◯) when it showed no discoloration; fair (Δ) when it showed a slight yellowing; and poor (X) when it showed a marked yellowing.

(b) As to cracking and film separation, the cured film was rated as good (◯) when neither cracking nor film separation was observed; and poor (X) when cracking and/or film separation was observed.

EXAMPLES 1-6 and COMPARATIVE EXAMPLES 1-6

Coating compositions were prepared according to the formulations shown in Tables 1 and 2, and each of them was spray-coated on a 3 mm thick plate made of polycarbonate resin (commercially available from General Electric Company under the trade name of Lexan LS-II) so as to give a cured film thickness of 8 $\mu$m. After the organic solvent was flashed by heating, the coating film was exposed to ultraviolet light from a high-pressure mercury vapor lamp in air until the integrated quantity of light over the wavelength range of 340 to 380 nm reached an energy level of 3,000 mJ/cm$^2$. The resulting cured films were evaluated and the results thus obtained are shown in Tables 1 and 2.

EXAMPLE 7 and COMPARATIVE EXAMPLE 7

Coating compositions were prepared according to the formulations shown in Tables 1 and 2, and each of them was spray-coated on a 3 mm thick plate made of polymethyl methacrylate resin (commercially available from Mitsubishi Rayon Co., Ltd. under the trade name of Acripet VH) so as to give a cured film thickness of 8 μm. After the organic solvent was flashed by heating, the coating film was exposed to ultraviolet light from a high-pressure mercury vapor lamp in air until the integrated quantity of light over the wavelength range of 340 to 380 nm reached an energy level of 3,000 mJ/cm$^2$. The resulting cured films were evaluated and the results thus obtained are shown in Tables 1 and 2.

EXAMPLE 8 and COMPARATIVE EXAMPLE 8

Coating compositions were prepared according to the formulations shown in Tables 1 and 2, and each of them was spray-coated on a 3 mm thick plate made of polymethyl methacrylate resin (commercially available from Mitsubishi Rayon Co., Ltd. under the trade name of PMI) so as to give a cured flashed by heating. the coating film was exposed to ultraviolet light from a high-pressure mercury vapor lamp in air until the integrated quantity of light over the wavelength range of 340 to 380 nm reached an energy level of 3,000 mJ/cm$^2$. The resulting cured films were evaluated and the results thus obtained are shown in Tables 1 and 2.

The abbreviations used in Tables 1 and 2 are as follows.
DPPA: Dipentaerythritol pentaacrylate.
TAIC: Tris(2-acryloyloxyethyl) isocyanurate.
UA1: A urethane acrylate synthesized from 3 moles of bis(4-isocyanato cyclohexyl) methane, 2 mole of nonabutylene glycol and 2 moles of 2-hydroxyethyl acrylate and having a molecular weight of 2,500.
UA2: A urethane acrylate synthesized from 2 moles of isophorone diisocyanate, 1 mole of 2,2'-(hydroxyethyloxyphenyl)propane and 2 moles of 2-hydroxypropyl acrylate and having a molecular weight of 2,200.
TMPTA: Trimethylolpropane triacrylate.
BIP: Benzoin isopropyl ether.
BPN: Benzophenone.
MPG: Methyl phenyl glyoxylate.
HBPB: 2-(2-Hydroxy-5-tert-butylphenyl)benzotriazole.
HOBP: 2-Hydroxy-4-octoxybenzophenone.
DHBP: 2,4-Dihydroxybenzophenone.
BPMS: Bis(1,2,2,6,6-pentamethyl-4-piperidyl) sebacate.
BTMS: Bis(2,2,6,6-tetramethyl-4-piperidyl) sebacate.
PC: Polycarbonate.
PMMA: Polymethyl methacrylate.
PMI: Polymethacrylimide.

TABLE 1

|  |  | Example 1 | Example 2 | Example 3 | Example 4 | Example 5 | Example 6 | Example 7 | Example 8 |
|---|---|---|---|---|---|---|---|---|---|
| Coating composition | Substrate material | PC | PC | PC | PC | PC | PC | PMMA | PMI |
|  | Component (A) | DPPA | DPPA | DPPA | DPPA | DPPA | DPPA | DPPA | DPPA |
|  | (parts by weight) | 40 | 58 | 35 | 32 | 45 | 42 | 42 | 42 |
|  | Component (B) | UA1 | UA1 | UA1 | UA1 | UA2 | UA1 | UA1 | UA1 |
|  | (parts by weight) | 24 | 18 | 45 | 10 | 17 | 24 | 26 | 24 |
|  | Component (C) | TAIC | TAIC | TAIC | TAIC | TAIC | TAIC | TAIC | TAIC |
|  | (parts by weight) | 23 | 10 | 7 | 45 | 25 | 23 | 26 | 24 |
|  | Component (D) | HBPB | HBPB | HBPB | DHBP | HBPB | HBPB / DHPB | HBPB | HBPB |
|  | (parts by weight) | 9 | 10 | 9.5 | 9.5 | 9 | (4) / (3.5) | 1 | 5 |
|  | Component (E) | BNP | BNP | BNP | BNP | MPG | BNP / MPG | BNP | BNP |
|  | (parts by weight) | 3 | 3 | 3 | 3 | 3 | (1) / (2) | 3 | 3 |
|  | Component (F) | BTMS | BPMS | BTMS | BPMS | BTMS | BTMS | BTMS | BTMS |
|  | (parts by weight) | 1 | 1 | 0.5 | 0.5 | 1 | 0.5 | 2 | 2 |
|  | (Total) | 100 | 100 | 100 | 100 | 100 | 100 | 100 | 100 |
| Organic solvent | Isobutanol | 140 | 140 | 140 | 140 | 140 | 140 | 140 | 140 |
|  | n-Butyl acetate | 50 | 50 | 50 | 50 | 50 | 50 | 50 | 50 |
|  | Butyl cellosolve | 20 | 20 | 20 | 20 | 20 | 20 | 20 | 20 |
|  | Cellosolve acetate | 10 | 10 | 10 | 10 | 10 | 10 | 10 | 10 |
|  | (Total) | 220 | 220 | 220 | 220 | 220 | 220 | 220 | 220 |
| (Sum total) |  | 320 | 320 | 320 | 320 | 320 | 320 | 320 | 320 |
| Initial performance | 1) Appearance | ○ | ○ | ○ | ○ | ○ | ○ | ○ | ○ |
|  | 2) Abrasion resistance | ○ | ○ | ○ | ○ | ○ | ○ | ○ | ○ |
|  | 3) Adhesion | ○ | ○ | ○ | ○ | ○ | ○ | ○ | ○ |
|  | 4) Thermal resistance | ○ | ○ | ○ | ○ | ○ | ○ | ○ | ○ |
| Weather resistance | 1,000 hours a) Appearance | ○ | ○ | ○ | ○ | ○ | ○ | ○ | ○ |
|  | b) Cracking | ○ | ○ | ○ | ○ | ○ | ○ | ○ | ○ |
|  | c) Adhesion | ○ | ○ | ○ | ○ | ○ | ○ | ○ | ○ |
|  | 2,000 hours a) Appearance | ○ | ○ | ○ | ○ | ○ | ○ | ○ | ○ |
|  | b) Cracking | ○ | ○ | ○ | ○ | ○ | ○ | ○ | ○ |
|  | c) Adhesion | ○ | ○ | ○ | ○ | ○ | ○ | ○ | ○ |

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
|  | Substrate material | PC | PC | PC | PC | PC | PC | PMMA | PMI |
| Coating composition | Component (A) | DPPA | DPPA | DPPA | DPPA | DPPA | DPPA | DPPA | DPPA |
|  | (parts by weight) | 5 | 45 | 55 | 42 | 44 | 28 | 42 | 42 |
|  | Component (B) | UA1 | — | UA1 | UA1 | UA1 | UA1 | UA1 | UA1 |
|  | (parts by weight) | 37 |  | 32 | 24 | 26 | 17 | 27 | 25 |
|  | Component (C) | TAIC | TAIC | — | TMPTA | TAIC | TAIC | TAIC | TAIC |
|  | (parts by weight) | 45 | 42 |  | 23 | 25 | 17 | 27 | 25 |
|  | Component (D) | HBPB | HBPB | HBPB | HBPB (4) DHPB (4) | HBPB | HBPB | HBPB | HBPB |
|  | (parts by weight) | 9 | 9 | 9 |  | 1 | 35 | 1 | 5 |
|  | Component (E) | BNP | BNP | BNP | BNP (1) MPG (2) | BNP | BNP | BNP | BNP |
|  | (parts by weight) | 3 | 3 | 3 |  | 3 | 3 | 3 | 3 |
|  | Component (F) | BTMS | BPMS | BTMS | — | BTMS | — | — | — |
|  | (parts by weight) | 1 | 1 | 1 |  | 1 |  |  |  |
|  | (Total) | 100 | 100 | 100 | 100 | 100 | 100 | 100 | 100 |
| Organic solvent | Isobutanol | 140 | 140 | 140 | 140 | 140 | 140 | 140 | 140 |
|  | n-Butyl acetate | 50 | 50 | 50 | 50 | 50 | 50 | 50 | 50 |
|  | Butyl cellosolve | 20 | 20 | 20 | 20 | 20 | 20 | 20 | 20 |
|  | Cellosolve acetate | 10 | 10 | 10 | 10 | 10 | 10 | 10 | 10 |
|  | (Total) | 220 | 220 | 220 | 220 | 220 | 220 | 220 | 220 |
| (Sum total) |  | 320 | 320 | 320 | 320 | 320 | 320 | 320 | 320 |
| Initial performance | 1) Appearance | ○ | ○ | ○ | ○ | ○ | X | ○ | ○ |
|  | 2) Abrasion resistance | X | ○ | △ | ○ | ○ | ○ | ○ | ○ |
|  | 3) Adhesion | ○ | △ | ○ | ○ | ○ | △ | ○ | ○ |
|  | 4) Thermal resistance | ○ | X | X | ○ | ○ | X | ○ | ○ |
| Weather resistance | 1,000 hours a) Appearance | ○ | ○ | ○ | ○ | △ | X | ○ | ○ |
|  | b) Cracking | ○ | ○ | △ | △ | X | X | △ | △ |
|  | c) Adhesion | ○ | △ | △ | ○ | X | X | X | X |
|  | 2,000 hours a) Appearance | ○ | △ | △ | △ | X | X | △ | △ |
|  | b) Cracking | ○ | X | X | X | X | X | X | X |
|  | c) Adhesion | ○ | X | X | X | X | X | X | X |

We claim:

1. A coating composition comprising
(A) 10 to 70 parts by weight of at least one monomer selected from poly(meth)acrylates of mono- or polypentaerythritols having the general formula

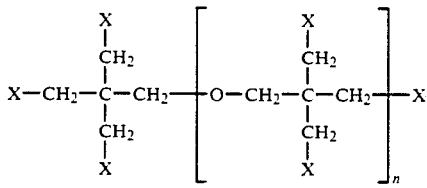

where at least three of X are $CH_2=CR-COO-$ groups and the rest are $-OH$ groups, n is 0, 1 or 2, and R is a hydrogen atom or a methyl group, (B) 5 to 50 parts by weight of at least one urethane poly(meth)acrylate having at least two radical-polymerizable unsaturated double bonds in the molecule, (C) 5 to 50 parts by weight of a poly[(meth)acryloyloxyalkyl] (iso)cyanurate having the general formula

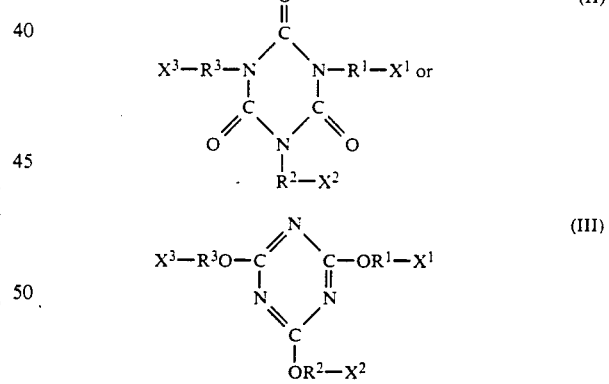

where $X^1$, $X^2$ and $X^3$ are acryloyl groups, methacryloyl groups, hydrogen atoms or alkyl groups and at least two of them need to be (meth)acryloyl groups, and $R^1$, $R^2$ and $R^3$ are single bonds or oxyalkylene groups of 1 to 4 carbon atoms, (D) 2 to 30 parts by weight of an ultraviolet absorber, (E) 0.1 to 10 parts by weight of a photopolymerization initiator, and (F) 0.1 to 5 parts by weight of a hindered amine light stabilizer, provided that the combined amount of components (A), (B), (C), (D), (E) and (F) is 100 parts by weight.

2. A coating composition as claimed in claim 1 wherein the monomer of the general formula (I) is dipentaerythritol tetraacrylate, dipentaerythritol pentaacrylate or dipentaerythritol hexaacrylate.

3. A coating composition as claimed in claim 1 wherein the urethane poly(meth)acrylate (B) is a reaction product obtained from a hydroxyl-containing (meth)acrylate and a polyisocyanate.

4. A coating composition as claimed in claim 3 wherein the polyisocyanate used for the synthesis of the urethane poly(meth)acrylate (B) is hexamethylene diisocyanate, 4,4'-methylenebis(cyclohexyl isocyanate), isophorone diisocyanate or 1,3-bis(isocyanatomethyl)-cyclohexane.

5. A coating composition as claimed in claim 3 wherein the hydroxyl-containing (meth)acrylate used for the synthesis of the urethane poly(meth)acrylate (B) is 2-hydroxyethyl acrylate, 2-hydroxyethyl methacrylate, 2-hydroxypropyl acrylate, 2-hydroxypropyl methacrylate, 4-hydroxybutyl acrylate or 4-hydroxybutyl methacrylate.

6. A coating composition as claimed in claim 3 wherein the urethane poly(meth)acrylate (B) has a molecular weight of 1,000 to 5,000.

7. A coating composition as claimed in claim 1 wherein the urethane poly(meth)acrylate (B) is a reaction product obtained by the addition of a hydroxyl-containing (meth)acrylate to the adduct of a polyol with a polyisocyanate.

8. A coating composition as claimed in claim 7 wherein the polyisocyanate used for the synthesis of the urethane poly(meth)acrylate (B) is hexamethylene diisocyanate, 4,4'-methylenebis(cyclohexyl isocyanate), isophorone diisocyanate or 1,3-bis(isocyanatomethyl)-cyclohexane.

9. A coating composition as claimed in claim 7 wherein the polyol used for the synthesis of the urethane poly(meth)acrylate (B) is ethylene glycol, propylene glycol, butylene glycol or a polyester polyol.

10. A coating composition as claimed in claim 7 wherein the hydroxyl-containing (meth)acrylate used for the synthesis of the urethane poly(meth)acrylate (B) is 2-hydroxyethyl acrylate, 2-hydroxyethyl methacrylate, 2-hydroxypropyl acrylate, 2-hydroxypropyl methacrylate, 4-hydroxybutyl acrylate or 4-hydroxybutyl methacrylate.

11. A coating composition as claimed in claim 3 or 4 wherein in the urethane poly(meth)acrylate (B) has a molecular weight of 1,000 to 5,000.

12. A coating composition as claimed in claim 1 wherein the monomer of the general formula (II) or (III) is bis(2-acryloyloxyethyl) hydroxyethyl isocyanurate or tris(2-acryloyloxyethyl) isocyanurate.

13. A coating composition as claimed in claim 1 wherein the ultraviolet absorber (D) is 2,4-dihydroxybenzophenone, 2-hydroxy-4-methoxybenzophenone, 2-(2-hydroxy-5-tert-butylphenyl)benzotriazole or 2-(2-hydroxy-5-octylphenyl)benzotriazole.

14. A coating composition as claimed in claim 1 wherein the photopolymerization initiator (E) is benzophenone, benzoin isopropyl ether, methylphenyl glyoxylate or benzyl dimethyl ketal.

15. A coating composition as claimed in claim 1 wherein the hindered amine type light stabilizer (F) is bis(1,2,2,6,6-pentamethyl-4-piperidyl) sebacate or bis(2,2,6,6-tetramethyl-4-piperidyl) sebacate.

16. An abrasion-resistant synthetic resin molded article having at least one surface coated with a coating composition as claimed in claim 1.

17. An abrasion-resistant synthetic resin molded article as claimed in claim 16 wherein the synthetic resin molded article is formed of a material selected from polymethyl methacrylate resin, polycarbonate resins and polymethacrylimide resin.

18. An abrasion-resistant synthetic resin molded article as claimed in claim 16 wherein the synthetic resin molded article is transparent.

* * * * *